United States Patent [19]

Foerch et al.

[11] Patent Number: 5,147,678
[45] Date of Patent: Sep. 15, 1992

[54] MODIFICATION OF POLYMER SURFACES BY TWO-STEP REACTIONS

[75] Inventors: Renate Foerch; Duncan H. Hunter; N. Stewart McIntyre, all of London; Rana N. S. Sodhi, Toronto, all of Canada

[73] Assignee: The University of Western Ontario, London, Canada

[21] Appl. No.: 456,119

[22] Filed: Dec. 22, 1989

[30] Foreign Application Priority Data

Dec. 22, 1988 [CA] Canada ................... 586755

[51] Int. Cl.$^5$ .............................................. B05D 3/06
[52] U.S. Cl. ......................................... 427/40; 427/41; 427/44
[58] Field of Search .................. 427/38, 39, 40, 41, 427/44, 54.1

[56] References Cited

U.S. PATENT DOCUMENTS

| | | | |
|---|---|---|---|
| 3,892,573 | 7/1975 | Tatsuta et al. | 427/40 |
| 4,267,202 | 5/1981 | Nakayama et al. | 427/40 |
| 4,393,092 | 7/1983 | Gill | 427/40 |
| 4,422,907 | 12/1983 | Birkmaier et al. | 427/40 |
| 4,576,692 | 3/1986 | Fukuta et al. | 427/40 |
| 4,645,551 | 2/1987 | Adams et al. | 427/40 |
| 4,717,516 | 1/1988 | Isaka et al. | 427/40 |
| 4,756,925 | 7/1988 | Furukawa et al. | 427/40 |
| 4,900,388 | 2/1990 | Wyslotsky | 427/40 |
| 4,919,659 | 4/1990 | Horbett et al. | 427/40 |
| 4,929,319 | 5/1990 | Dinter et al. | 427/40 |

Primary Examiner—Shrive Beck
Assistant Examiner—Marianne L. Padget
Attorney, Agent, or Firm—Ware, Fressola, Van Der Sluys & Adolphson

[57] ABSTRACT

Improved modification of polymer surfaces is achieved by two-step reactions on polymer surfaces, particularly where at least one of the steps is a "downstream" or remote plasma treatment. For example, polymers may be treated with various combinations of the following: (1) downstream nitrogen plasma treatment; (2) ozone treatment; (3) corona discharge treatment; (4) downstream oxygen plasma treatment; or (5) downstream hydrogen plasma treatment.

14 Claims, 13 Drawing Sheets

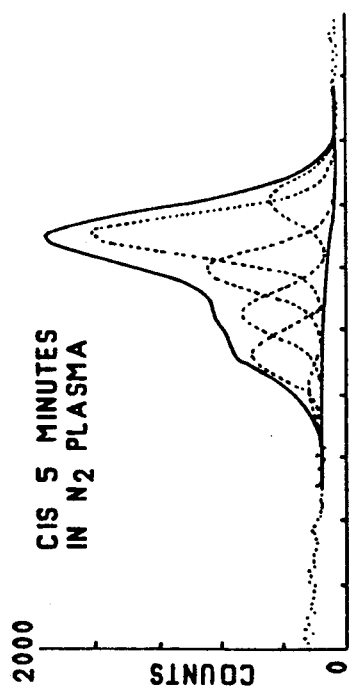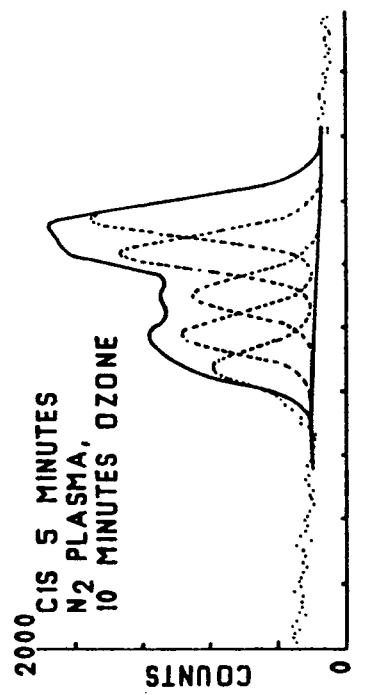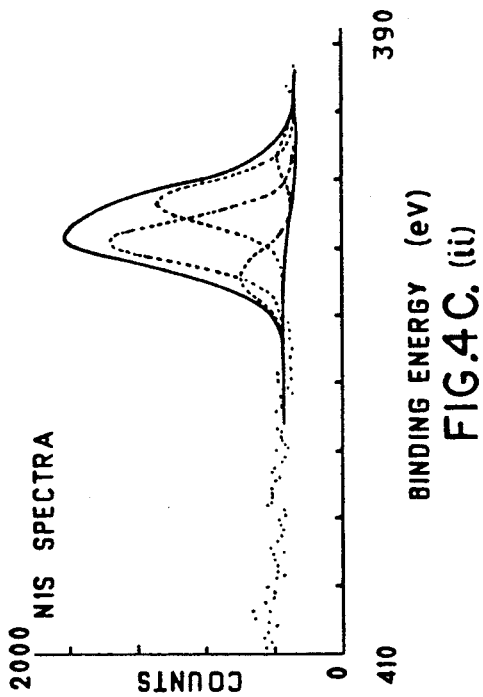

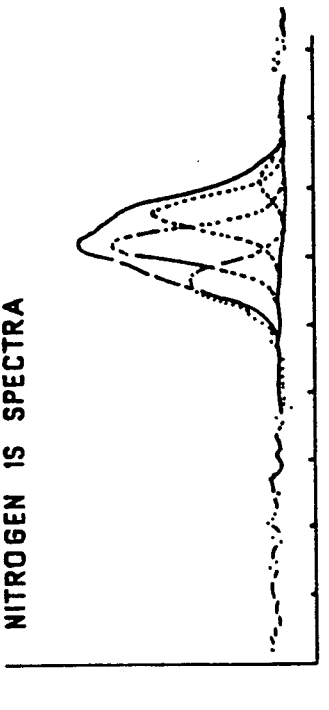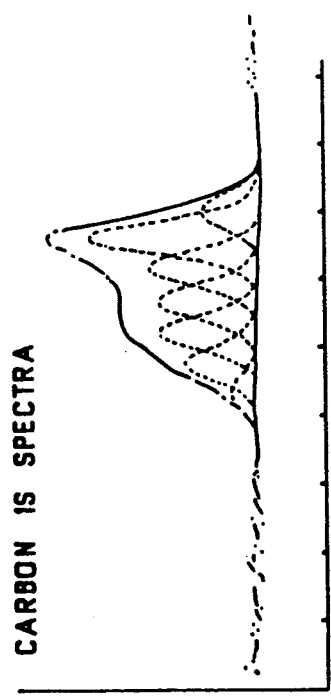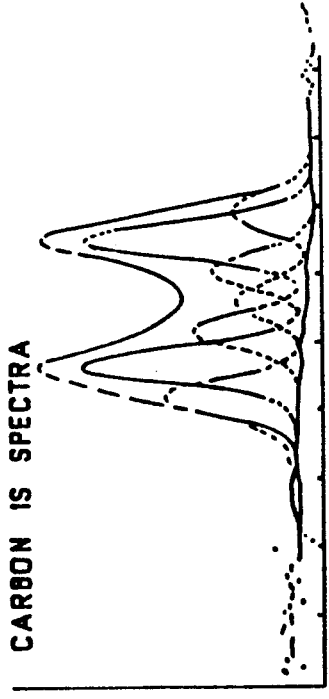
FIG. 5B.(i) CARBON 1S SPECTRA
FIG. 5B.(ii) NITROGEN 1S SPECTRA
FIG. 5C.(i) CARBON 1S SPECTRA
FIG. 5C.(ii) NITROGEN 1S SPECTRA

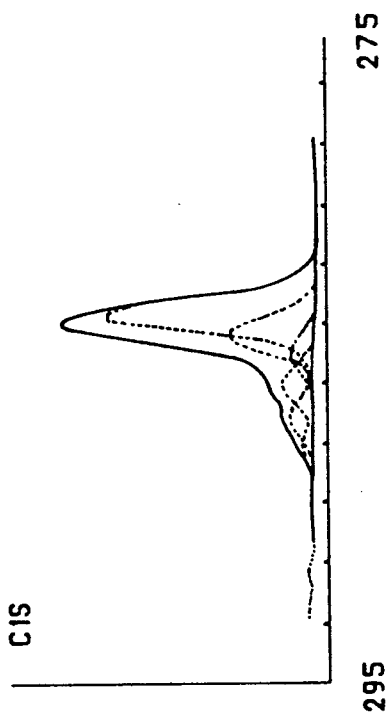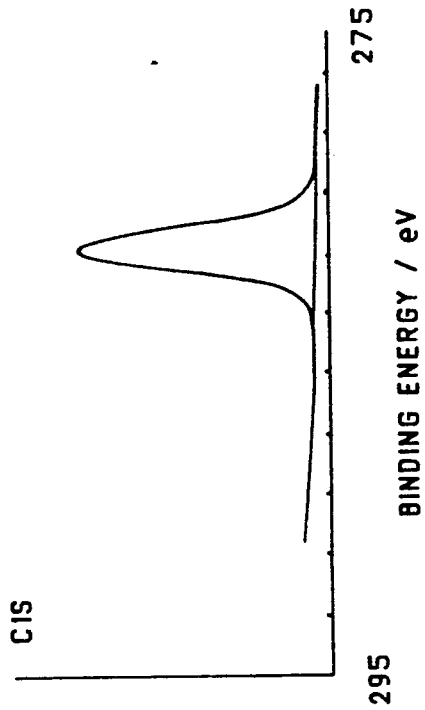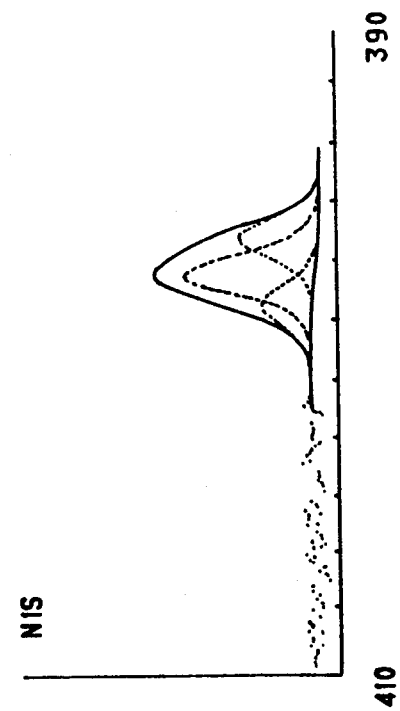
FIG. 6 B.(i)
FIG. 6 A.
FIG. 6 B.(ii)

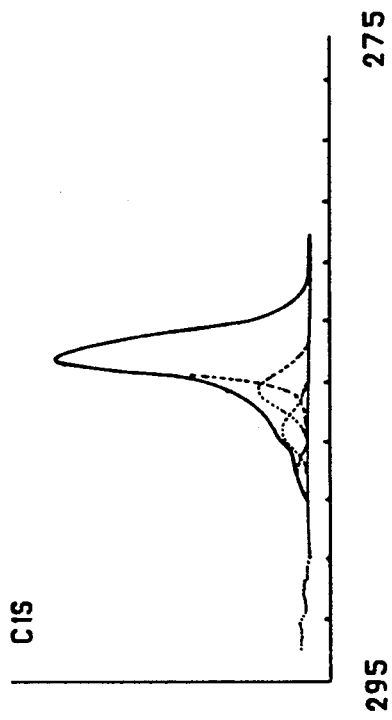
FIG. 6 D.
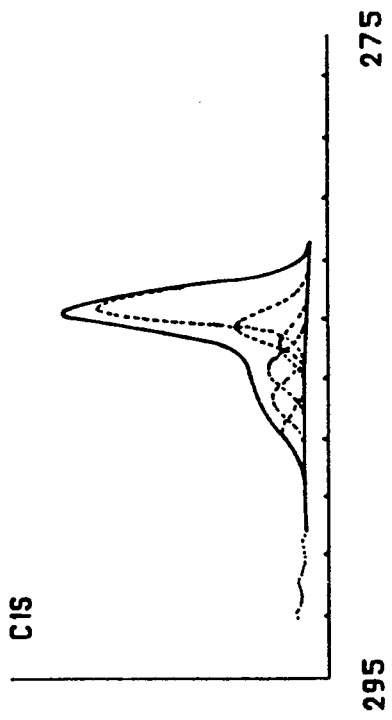
FIG. 6 C. (i)
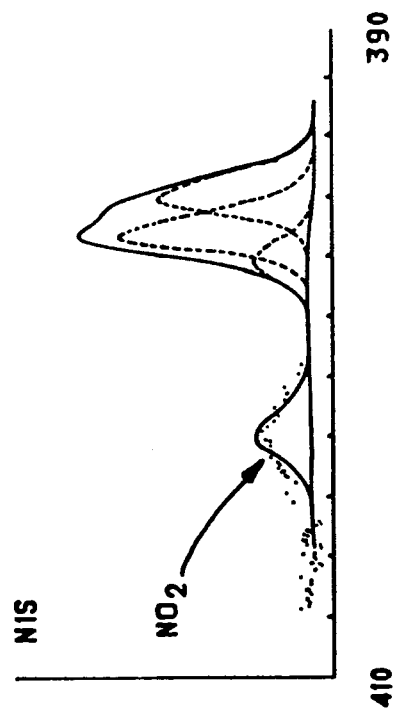
FIG. 6 C. (ii)

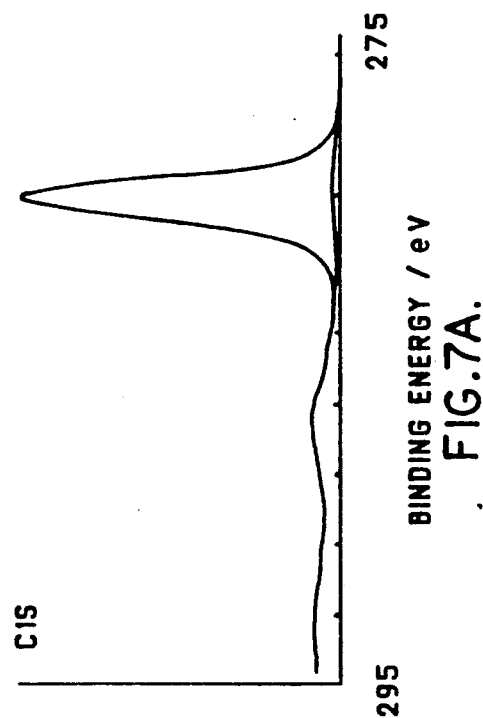
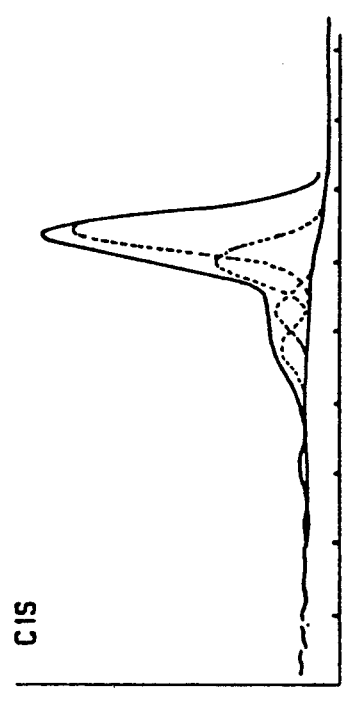
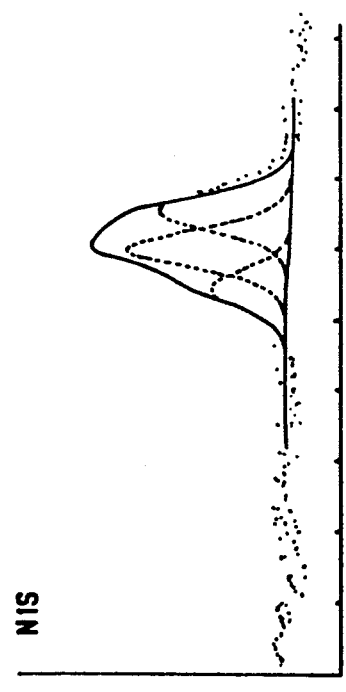

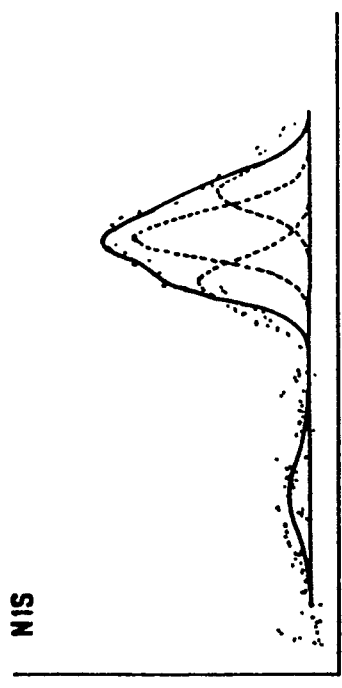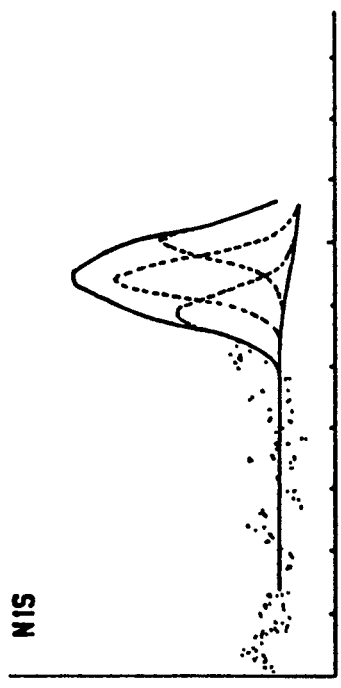
FIG. 7 D.(i)
FIG. 7 C.(i)
FIG. 7 D.(ii)
FIG. 7 C.(ii)

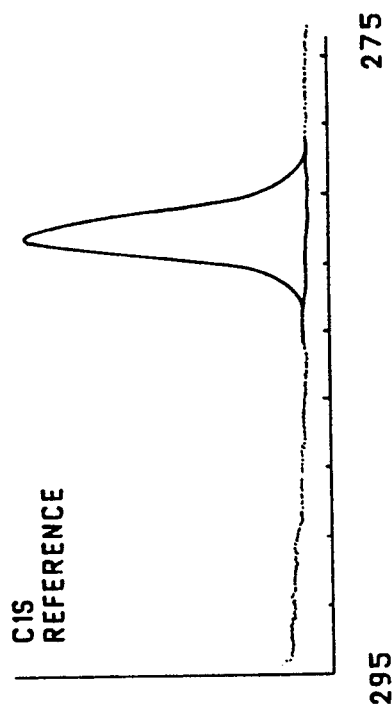
FIG. 8 A.
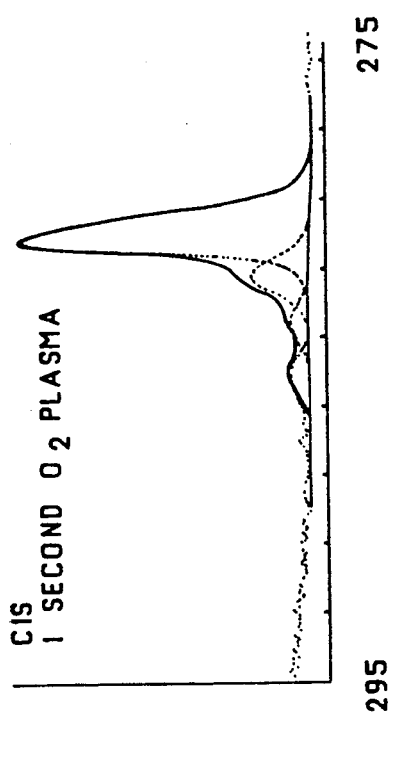
FIG. 8 B.(i)
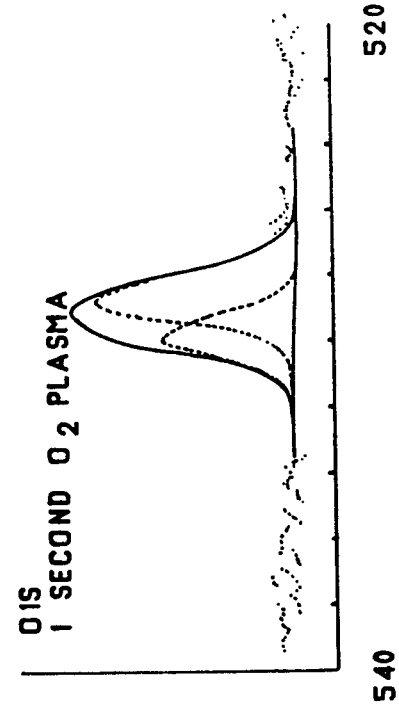
FIG. 8 B.(ii)

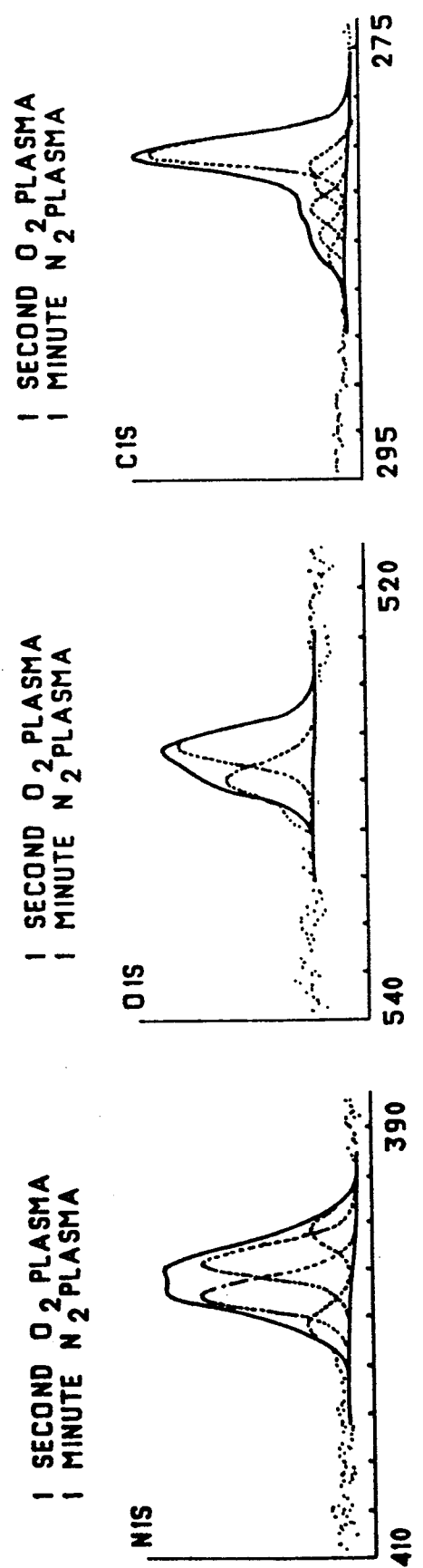

5,147,678

MODIFICATION OF POLYMER SURFACES BY TWO-STEP REACTIONS

BACKGROUND OF THE INVENTION

Methods of polymer surface modification in the past have included techniques such as ozone treatment, corona discharge and plasma treatment. The successful modification of polymer surfaces has enabled scientists to develop materials whose surface properties are different from their bulk properties. This has increased the potential uses of many polymers such as the heat resistant, high stress and long life polymers which in general are rather unreactive and provide a smaller range of applications. By surface modification of these polymers it is possible to alter their surface properties, such as the surface energy and consequently their wettability and printability.

One method which has been given considerable attention in literature is the modification of polymer surfaces by plasma treatment. This allows the very rapid chemical modification of typically the top 100 Angstroms or so of material. By choice of the gas used for the plasma it is further possible to choose the type of chemical modification to the polymer surface. Typical gases used are oxygen, argon, helium, nitrogen, ammonia, hydrogen and nitrogen oxide. Thus, for example, a nitrogen plasma will produce chemical species such as primary, secondary and tertiary amines, as well as cyano groups, on the surface of polymers.

Other common methods of polymer surface modification are ozone treatment and corona discharge, the latter of which is already in use in the plastics industry. In ozone treatment, oxygen is converted into ozone by the influence of ultraviolet radiation. The ozone thus formed then reacts with the surface polymer chains to form a variety of species. In corona treatment a high voltage discharge causes excitement of gas molecules (usually oxygen) which then interact with the polymer surface to form new functional groups. Both conventional ozone treatment and conventional corona discharge treatment are slow, and are known to cause considerable etching of the surface.

There is a constant need for improving the methods of modifying polymer surfaces.

SUMMARY OF THE INVENTION

The present inventors have determined that improved modification of polymer surfaces can be achieved by two-step reactions on polymer surfaces, particularly where at least one of the steps is "downstream" or remote plasma treatment, as further described herein. For example, polymers may be treated with various combinations of the following: (1) downstream nitrogen plasma treatment; (2) ozone treatment; (3) corona discharge treatment; (4) downstream oxygen plasma treatment; or (5) downstream hydrogen plasma treatment.

After the first treatment, for example remote plasma treatment, both the physical and chemical characteristics of the polymer surface are altered. Hence if the surface contains different chemical species, it will undergo a greater variety of chemical reactions. By exposing a polymer sample to two different surface treatments, more specific and unique chemical groups may be formed which may not be easily formed by wet chemical methods.

The results of the ozone treatment of polyethylene and polystyrene show that pretreatment with a nitrogen plasma causes an increase in the surface reactivity towards ozone treatment, and a level of surface functionality not previously reported. The results of corona discharge treatment following nitrogen plasma pretreatment indicate the formation of completely different chemical species than those created by ozone treatment alone or by conventional corona discharge or by any other physical method of surface modification.

In the invention, the reactor used in one of the two steps uses downstream or remote plasma treatment of the polymer surface. This is different from direct plasma treatment in that the sample surface is positioned away from the main plasma region, such that the sample is exposed to only the longest lived plasma species able to reach the sample, unlike the whole range of species that are present in the direct plasma process. This permits the desired surface modification effect to be achieved, without the polymer surface being so close to the plasma as to incur significant damage.

Further features of the invention will be described or will become apparent in the course of the following detailed description.

BRIEF DESCRIPTION OF THE DRAWINGS

In order that the invention may be more clearly understood, the preferred embodiment thereof will now be described in detail by way of example, with reference to the accompanying drawings, in which:

FIG. 4A shows the spectra before the reaction; FIG. 4B shows the spectra after 5 minutes in a remote nitrogen plasma, FIG. 4B(i) showing the C 1s spectra and FIG. 4B(ii) showing the N 1s spectra; FIG. 4C shows the spectra after the remote nitrogen plasma treatment followed by 10 minutes of ozone treatment, FIG. 4C(i) showing the C 1s spectra and FIG. 4C(ii) showing the N 1s spectra; FIG. 4D shows the spectra after ozone treatment alone;

FIG. 5A shows the spectra before the reaction; FIG. 5B shows the spectra after 20 minutes in a remote nitrogen plasma, FIG. 5B(i) showing the C 1s spectra and FIG. 5B(ii) showing the N 1s spectra; FIG. 5C shows the spectra after the remote nitrogen plasma treatment followed by 30 minutes of ozone treatment, FIG. 5C(i) showing the C 1s spectra and FIG. 5C(ii) showing the N 1s spectra; FIG. 5D shows the spectra after ozone treatment alone;

FIGS. 6A, 6B, 6C and 6D are drawings showing the C 1s and N 1s spectra for a polyethylene sample treated 30 seconds in a remote nitrogen plasma and 10 minutes in a corona discharge. FIG. 6A shows the spectra before the reaction; FIG. 6B shows the spectra after 30 seconds in a remote nitrogen plasma, FIG. 6B(i) showing the C 1s s spectra and FIG. 6B(ii) showing the N 1s spectra; FIG. 6C shows the spectra after the remote nitrogen plasma treatment followed by 10 minutes of corona discharge treatment, FIG. 6C(i) showing the C 1s spectra and FIG. 6C(ii) showing the N 1s spectra; FIG. 6D shows the spectra after corona discharge treatment alone;

FIGS. 7A, 7B, 7C and 7D are drawings showing the C 1s and N 1s spectra for a polyethylene sample treated 30 seconds in a remote nitrogen plasma and 10 minutes in a corona discharge. FIG. 7A shows the spectra before the reaction; FIG. 7B shows the spectra after 30 seconds in a remote nitrogen plasma, FIG. 7B(i) showing the C 1s spectra and FIG. 7B(ii) showing the N 1s spectra; FIG. 7C shows the spectra after the remote nitrogen plasma treatment followed by a corona discharge treatment, FIG. 7C(i) showing the C 1s spectra and FIG. 7C(ii) showing the N 1s spectra and FIG. 7D shows the spectra with a 5-minute nitrogen plasma pretreatment, FIG. 7D(i) showing the C 1spectra and FIG. 7D(ii) showing the N1s spectra; and FIGS. 8A, 8B, and 8C are drawings showing the C 1s, O 1s and N 1s of LLDPE treated with an oxygen plasma followed by a nitrogen plasma, at a flow rate of 2000 sccm, approximately 23 cm from the plasma. FIG. 8A shows the spectra before the reaction; FIG. 8B shows the spectra after 1 second in a remote nitrogen plasma, FIG. 8B(i) showing the C 1s spectra and FIG. 8B(ii) showing the O 1s spectra; FIG. 8C showing the spectra after the remote oxygen plasma treatment followed by a 1-minute remote nitrogen plasma treatment, FIG. 8C(i) showing the C 1s spectra, FIG. 8C(ii) showing the O 1s spectra, and FIG. 8C(iii) showing the n 1s spectra.

DETAILED DESCRIPTION OF THE PREFERRED EMBODIMENT

1. Apparatus

Figure 1:
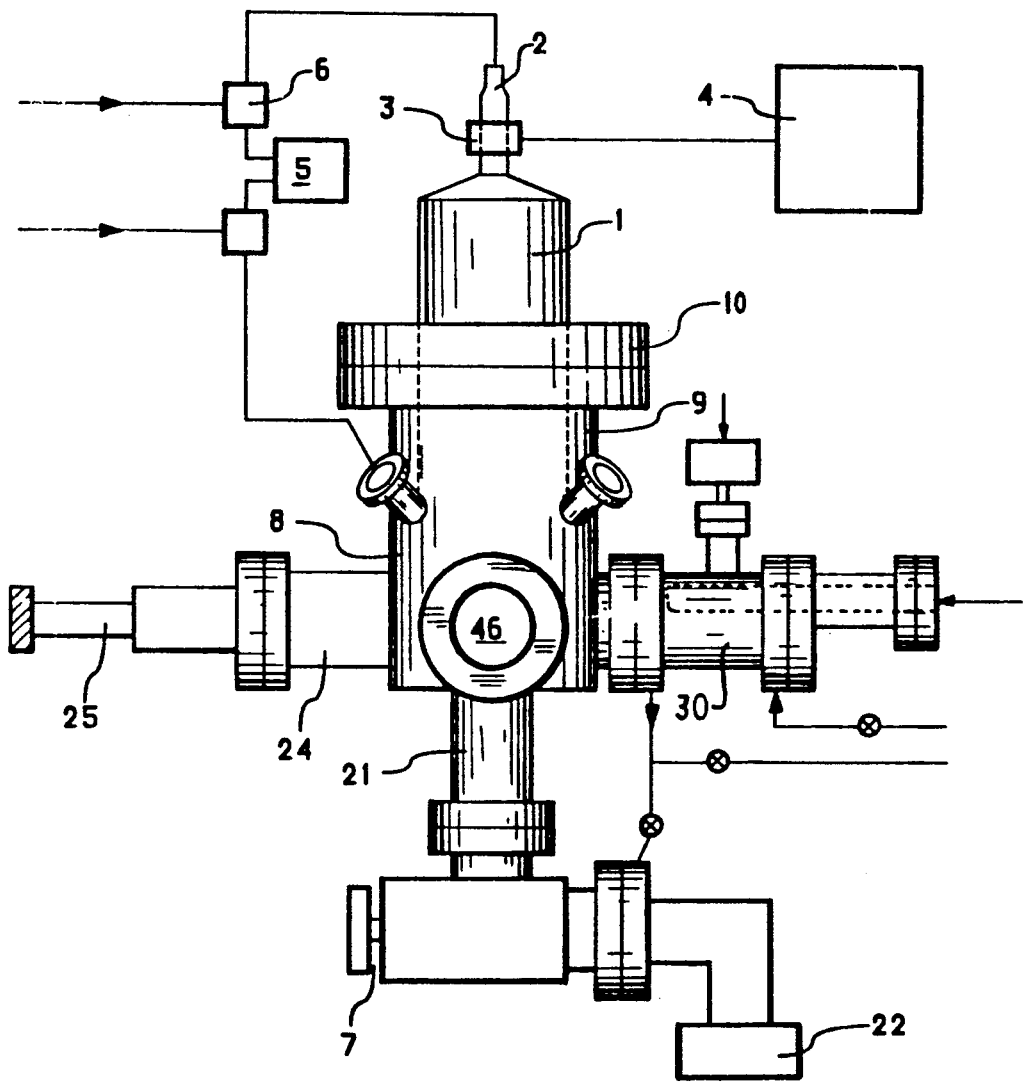
FIG. 1 is a side view of the experimental apparatus, showing the primary and secondary reactors, where the secondary reactor is configured for ozone treatment.
Figure 2:
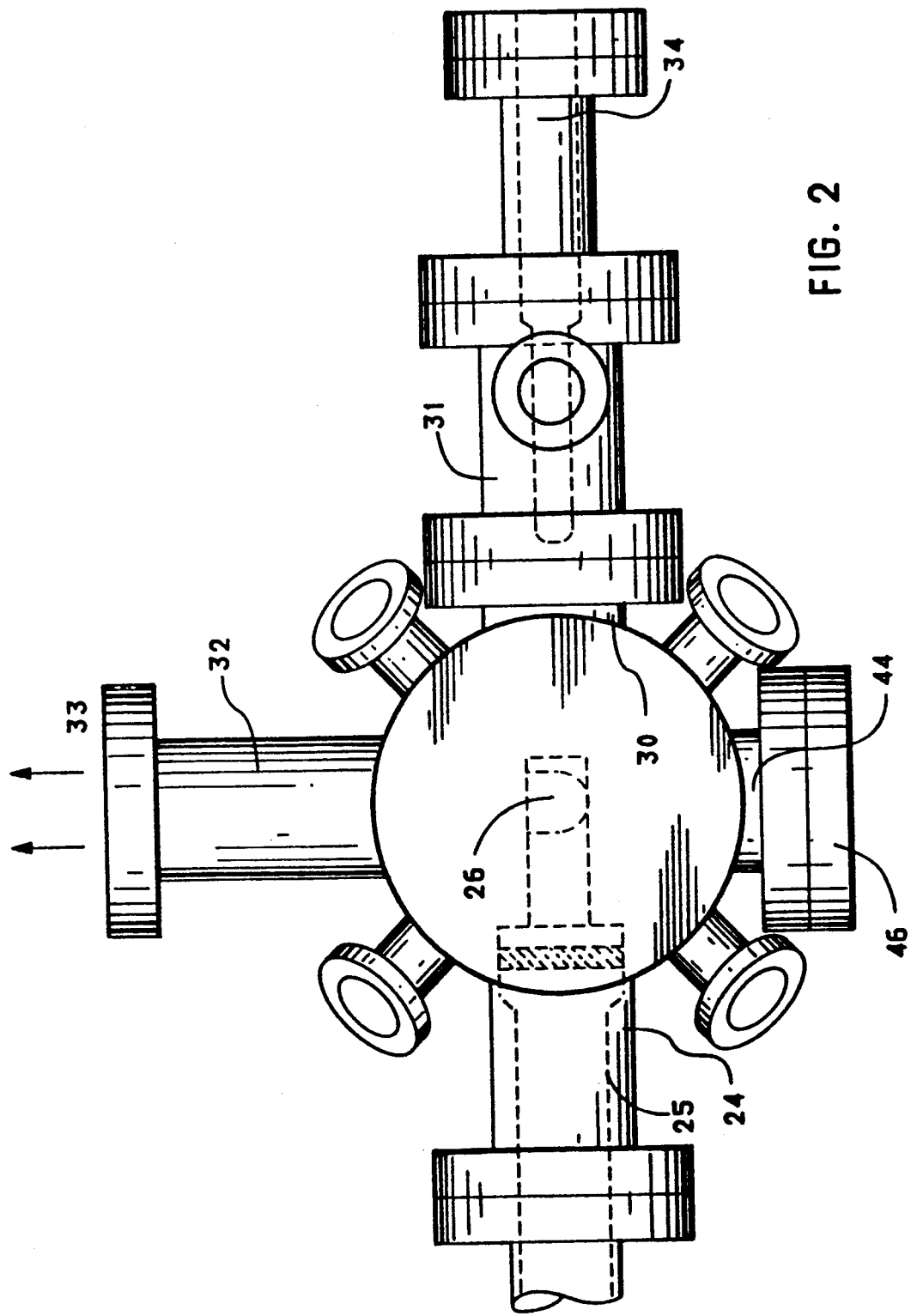
FIG. 2 is a top view of the apparatus.

The preferred plasma reactor, shown in FIGS. 1 and 2, uses a downstream or remote plasma. The reactor includes a 10 cm diameter quartz tube 1 equipped with a 1.5 cm diameter nozzle 2 which extends through a microwave cavity 3. The plasma is produced using ultra-high purity nitrogen by a 2.45 GHz microwave discharge which is driven by a microwave generator 4 connected to the cavity. The maximum power output is 120 watts. The plasma is thus excited by a high voltage discharge and maintained within the microwave cavity.

The nitrogen flow rate is controlled by a mass flow controller 5, which controls a flow meter 6. The pressure of the system can be adjusted by means of a manual throttle valve 7 situated below the sample chamber 8. The sample chamber is positioned approximately 23 cm down from the microwave cavity 3 and has two opposing side arms 24 and 30, one lower arm 21 for connection to the pumping system, one view port 46 and another side arm for attachment to the X-ray photoelectron spectrometer (not shown).

The lower part 9 of the quartz tube 1 extends into a 7.5 cm. diameter stainless steel sample chamber 8 in which the sample is positioned. An O-ring seal arrangement is used to effect a seal between the quartz tube and the sample chamber.

The sample chamber 8 has four main connecting side arms and one lower arm 21 for connection to the vacuum pumping system 22.

One side arm 24 has a manual linear sample feedthrough plunger 25, equipped with a sample shelf 26 made from a stainless steel block, as seen best in FIG. 2. The sample can thus be fed through from the sample chamber through the opposite side arm 30 to an ozone reactor chamber 31. The ozone reactor is equipped with a low temperature mercury lamp 34, a capacitance manometer 36 and gas inlet 38 and outlet 40.

Figure 3:
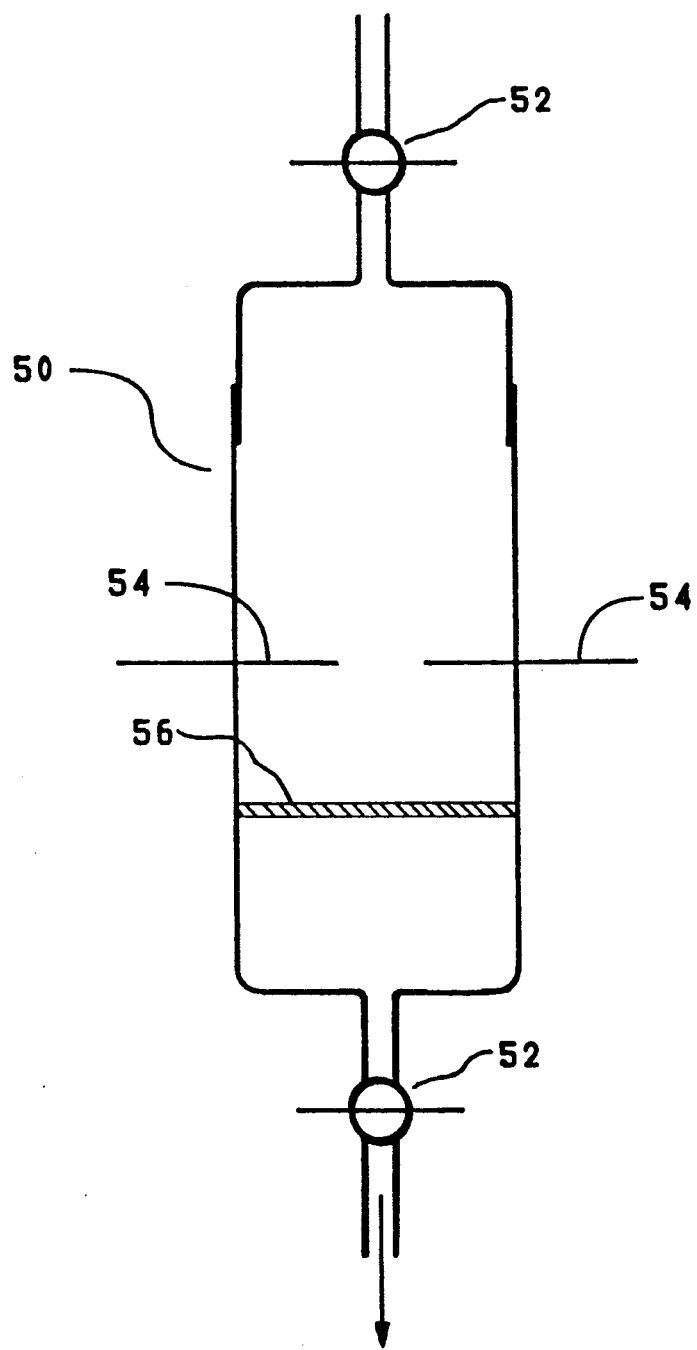
FIG. 3 is a view of the air discharge reactor used as an alternative to the ozone reactor.
Figure 4:
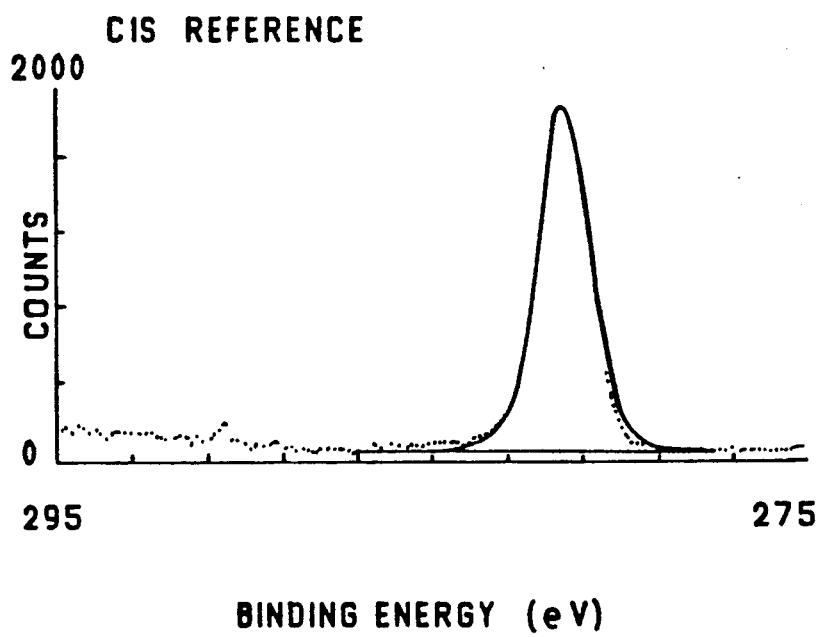
FIGS. 4A, 4B, 4C and 4D are drawings showing the C 1s and N 1s spectra for a low density polyethylene sample treated 5 minutes in a remote nitrogen plasma and 10 minutes in ozone.
Figure 4:
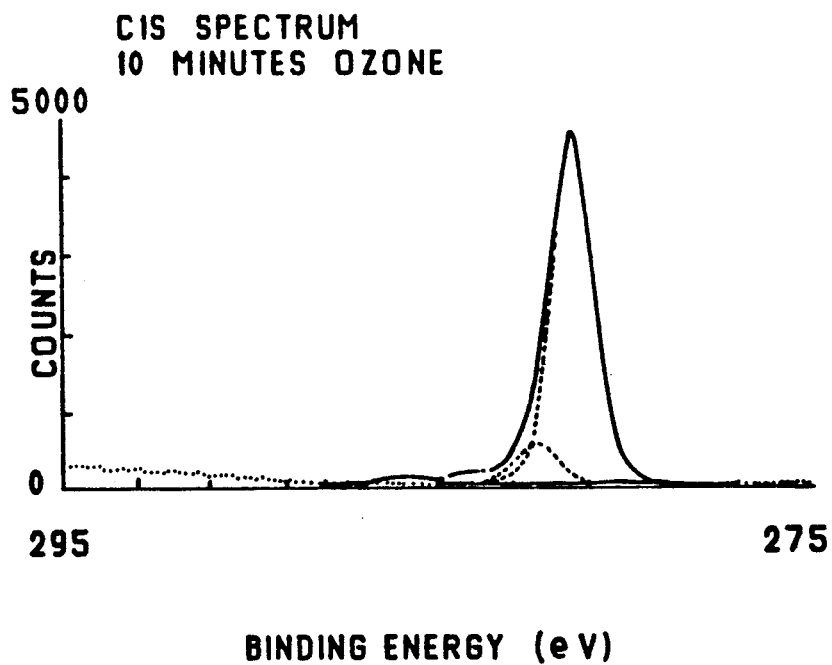
Figure 5:
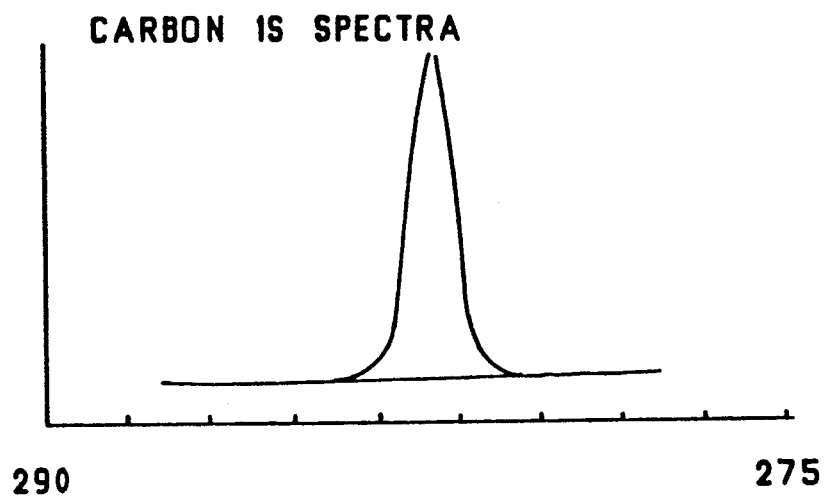
FIGS. 5A, 5B, 5C and 5D are drawings showing the C 1s and N 1s spectra for a low density polyethylene sample treated 20 minutes in a remote nitrogen plasma and 30 minutes in ozone.
Figure 5:
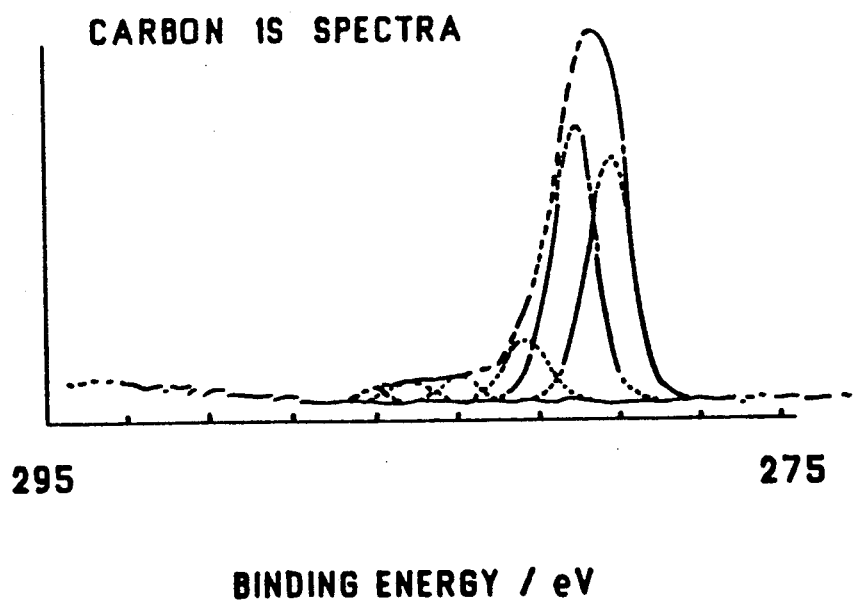

The corona discharge experiments were performed in a small scale corona discharge reactor shown in FIG. 3. This basically consists of a 30 mm diameter quartz tube 50 equipped with taps 52 at either end and two electrodes 54 whose tips are 1 cm. apart and 1.5 cm. above a $SiO_2$ frit 56 on which the sample is placed. During operation the lower tap is attached to vacuum, thus pulling air through the system.

2. Experimental Results a. General

The polymer samples should preferably be quite clean. In the case of the samples used in the experiments, both the polyethylene and the polystyrene samples were in the form of small pellets. Previous work with polyethylene showed that the surface of such samples often contained contaminating silicone oil. Furthermore, it was found that in the presence of silicon oil the remote nitrogen and oxygen treatment of polyethylene as a function of exposure time was inconsistent and not reproducible. Thus several methods were investigated to remove the contaminant. The fastest and most efficient method was found to be ultrasonic washing of the pellets in dichloromethane for a few minutes, followed by drying in a vacuum desiccator. Starting with relatively clean samples in the first place would avoid this complication. The washed and dried pellets were then placed into a small vice and mounted on special sample holders designed for the transfer of samples between the reactor and analyzer chamber. For the ozone and corona discharge reactions the samples were transferred in the vice to the ozone reactor via the linear feed through, and to the discharge reactor using tweezers. The latter required exposure to air.

The best working conditions for the experiments at the 23 cm experimental distance were at the maximum gas flow rate for the experimental apparatus, namely 2000 sccm, and a power level of 50%. At this flow rate the pressure within the reactor was 5.4 Torr. Higher flow rates, not attainable on the experimental equipment, could be expected to produce even better results.

Subsequent experiments focussing on downstream plasma treatment alone have shown that even more favourable results for the downstream plasma treatment aspect of the invention may be obtained closer to the main region of the plasma, but still outside the main region, in the "afterglow" region. We define the main plasma region as that part of the plasma contained within the microwave cavity 3. Outside this microwave cavity the color of the glow changes and we refer to this as the afterglow region. These subsequent experiments are described in detail in our co-pending United States patent application entitled "Modification of Polymer Surfaces in a Remote Plasma Reactor", filed on Dec. 7, 1989, Ser. No. 07/447,402, claiming priority from Canadian patent application Ser. No. 586,754, filed Dec. 22, 1988.

Before reaction, the reactor was baked for 12 hours at 130 degrees Celsius after which a base pressure of 8 * $10^{-9}$ Torr was achieved. X-ray photoelectron analysis was performed on an SSX-100 (trademark) Surface Science Laboratories photoelectron spectrometer, which utilises a monochromatised Al Kα X-ray source.

For the broad elemental scans a spot size of 1000 μm and a pass energy of 148.00 eV was used, while for the core level spectra a spot size of 150 μm and a pass energy of 50.0 eV was utilized.

b. Nitrogen plasma followed by ozone treatment

FIGS. 3 and 4A-4D show results of two sets of reactions carried out using low density polyethylene and high density polyethylene respectively, for various exposure times to the nitrogen plasma and ozone. FIGS. 4A-4D and 5A-5D show the C 1s spectrum before reaction as a single peak, the C 1s and N 1s spectra after exposure to the remote nitrogen plasma and the C 1s and N 1s spectra after the subsequent ozone treatment. The last C 1s spectrum shown is that of ozone treatment alone. The elemental analyses are given in Tables 1 and 2.

TABLE 1

5-minute nitrogen plasma treatment followed by 10-minute ozone treatment

| Experiment | % C | % N | % O |
| --- | --- | --- | --- |
| 5 minutes N₂ plasma | 65.9 | 22.7 | 11.4 |
| 5 minutes N₂ 10 minutes O₃ | 60.3 | 18.3 | 21.4 |
| 10 minutes O₃ | 83.9 | — | 10.6 |

TABLE 2

XPS data for 30 minutes nitrogen plasma treatment at 1000 sccm, followed by 10 minutes ozone treatment, compared to 10 minutes ozone treatment only

| Experiment | % C | % N | % O |
| --- | --- | --- | --- |
| 30 minutes N₂ plasma | 62.0 | 30.0 | 8.0 |
| 30 minutes N₂ 10 minutes O₃ | 53.0 | 30.0 | 17.0 |
| 10 minutes O₃ | 88.0 | — | 12.0 |

FIGS. 4A-4D shows the effect on low density polyethylene of a 5 minute exposure to a remote nitrogen plasma, indicating that a high degree of functionality is obtained, which is observed as the increase in the peak components at the high energy side of the carbon 1s spectra. Subsequent exposure to ozone alters the shape of the C 1s spectrum even further by increasing the intensity of the high energy components of the C 1s peak, thus indicating that carbon oxygen species are being formed. While both these C 1s spectra indicate a high degree of functionality, that of the single step ozone reaction indicates very little functionality. Thus, the two-step reaction of a remote nitrogen plasma for 5 minutes followed by ozone for 10 minutes creates a surface saturated with carbon-nitrogen and carbon-oxygen functional groups. In comparison, the effect of a 10 minute exposure to ozone alone causes some, yet comparably small amount of functionality on the polymer surface.

FIGS. 5A-5D shows the same series of reactions using high density polyethylene under extended exposure times to both the remote nitrogen plasma and ozone. The effect on the C 1s peak profiles is seen to be even more extensive and the difference between the products of the two-step and single step reactions is even greater than in the reaction with LDPE using shorter exposure times, FIGS. 4A-4D.

These reactions clearly indicate that even though the initial remote plasma treatment causes a substantial increase in the percentage of functionality on the surface, the reaction of ozone in the two-step reaction is more effective than in the single step reaction. It thus appears that the initial nitridation of the polyethylene surface increase the susceptibility of the surface to ozone reactions. In addition, it was noted that while during the downstream nitrogen plasma treatment amine groups were formed on the surface, the subsequent ozone reaction did not appear to oxidize the amine groups, which would become apparent as high energy peaks in the nitrogen 1s core level spectra.

c. Nitrogen plasma treatment followed by corona discharge treatment

In a similar experiment, low density polyethylene was reacted with a remote nitrogen plasma followed by a corona discharge. FIGS. 6A-6D shows two sets of data: the C 1s and N 1s spectra of the remote nitrogen plasma treatment alone and those of the two-step corona discharge reaction. Oxygen was always incorporated during remote nitrogen plasma treatment, the origin of which may be associated with residual water vapour in the reactor. The elemental analysis is given in Table 3.

TABLE 3

Polyethylene in two-step reactions with corona discharge

| Experiment | % C | % N | % O |
| --- | --- | --- | --- |
| 5 minutes N₂ | 66.6 | 21.6 | 11.8 |
| 5 minutes N₂ 10 minutes corona | 61.9 | 19.1 | 19.1 |

As with the two-step ozone reaction, the C 1s spectra of the two-step corona discharge treated polymer indicate a change in the surface chemistry, with an increase in the intensity of the high energy peak components indicating an increase in carboxyl and carbonyl functional groups. When comparing the N 1s spectra, the presence of a new peak, separated by 8.2 eV from the main peak, indicates the formation of NO₂ groups. This leads to suggest that entirely different chemical species are formed in the two different sets of reactions and that the two reactions follow rather different reaction mechanisms.

When a similar set of reactions was attempted with polystyrene, further interesting phenomena were observed. FIGS. 7A-7D shows two two-step corona discharge reactions of polystyrene. The two differ in the length of exposure time to the nitrogen plasma and thus the extent of nitridation of the polymer surface. Table 4 gives the elemental analysis.

TABLE 4

Polystyrene in two-step reactions with corona discharge

| Experiment | % C | % N | % O |
| --- | --- | --- | --- |
| 30 seconds N₂ | 77.7 | 15.0 | 7.3 |
| 30 seconds N₂ 10 minutes corona | 65.5 | 12.7 | 21.7 |
| 5 minutes N₂ | 70.0 | 19.2 | 10.8 |
| 5 minutes N₂ 10 minutes corona | 61.0 | 18.6 | 19.11 |

As can be seen from FIGS. 7A-7D, if the polystyrene is exposed to the remote nitrogen plasma for a time period of 30 seconds (incorporation of 15% N), then the subsequent corona discharge does not cause the formation of NO₂ groups on the surface at the detection limits of photoelectron spectroscopy. However, when the exposure time to the remote nitrogen plasma is increased to 5 minutes (incorporation of 19.2% N), then the subsequent corona discharge reaction does cause the formation of $NO_2$ groups. This suggests that the formation of $NO_2$ groups on polystyrene surfaces is dependant on the amount of nitridation of the polymer surface. A similar reaction with polyethylene showed that even at lower concentration of surface nitrogen groups, $NO_2$ groups were formed in the two-step corona discharge reaction. It is of interest to note that the intensity of the high energy peak in the N 1s spectrum of polystyrene is of lower intensity than that of polyethylene, further suggesting that the structure differences of the two polymers play an important part in determining the reaction rate and pathway.

To the inventors' knowledge, surface $NO_2$ groups have not been formed before by dry chemical processes such as those described in this work.

When this reaction is reversed, i.e. corona treatment before nitrogen plasma treatment, $NO_2$ groups are not observed. For example, corona discharge was performed for 10 minutes followed by 10 seconds remote nitrogen plasma treatment at 5 cm from the plasma, and no $NO_2$ groups could be detected. Further work is however required to show this with longer exposure times.

d. Remote N. treatment followed by remote $H_2$ treatment

Polyethylene and polypropylene samples were exposed to a remote nitrogen plasma (23 cm from plasma, 2000 sccm) to firstly functionalise the surface. Each of the samples was then exposed to a hydrogen plasma run at a flow rate of 500 sccm. Table 5 gives the results of these experiments. Polyethylene incorporated 12 atom % nitrogen on the surface, while polypropylene indicated the uptake of 15 atom % nitrogen after remote nitrogen plasma treatment. In each case oxygen was also incorporated. The subsequent exposure to a remote hydrogen plasma changed the concentration of nitrogen on both polymer surfaces. The oxygen concentration observed on the polyethylene surface was seen to remain constant (within experimental error), while that on the polypropylene surface decreased from 7 atom % to 4 atom % during the remote hydrogen plasma treatment.

TABLE 5

| $N_2$ plasma treatment followed by $H_2$ plasma treatment | | | |
|---|---|---|---|
| Experiment | % C | % N | % O |
| Polyethylene: | | | |
| $N_2$ plasma | 81.8 | 12.2 | 6.0 |
| $N_2$—$H_2$ plasmas | 82.4 | 9.1 | 7.4 |
| Polypropylene: | | | |
| $N_2$ plasma | 77.4 | 15.6 | 6.9 |
| $N_2$—$H_2$ plasma | 84.2 | 10.2 | 4.3 |

This suggests that the hydrogen plasma causes the loss of nitrogen from the surface. Whether this occurs as result of an etching process removing the top monolayers of the materials, or chemical substitution reaction, or both of these simultaneously, is yet unclear.

e. Remote $O_2$ followed by remote $N_2$ plasma treatment

Some of our previous data has suggested that the uptake of nitrogen by LLDPE is dependant on "active sites" present on the surface. It is thought that such active sites may be oxygen groups on the surface. Thus by adding oxygen prior to nitrogen plasma treatment it may be possible to increase the rate of nitrogen incorporation into the polymer.

A sample of LLDPE was firstly exposed to a remote oxygen plasma at 23 cm from the plasma using a flow rate of 2000 sccm. Table 6 shows the elemental data obtained for the reactions. Within 1 second 17.8 atom % oxygen was incorporated. The C 1s spectrum indicates the presence of COH groups and lesser amounts of $C=O$ and $O-C=O$ on the surface, FIG. (17). The O 1s spectrum indicates the presence of 2 peaks representing $O-C$ and $O=C$.

TABLE 6

| Remote $O_2$ plasma treatment followed by remote $N_2$ plasma treatment | | | | | |
|---|---|---|---|---|---|
| Experiment | % C | % N | N/C*100 | % O | O/C*100 |
| $O_2$ plasma | 81.3 | — | — | 17.8 | 21.9 |
| +$N_2$ plasma | 71.9 | 13.2 | 18.4 | 14.5 | 20.2 |

Subsequent remote nitrogen plasma treatment for 1 minute at a distance of 23 cm using a flow rate of 2000 sccm showed an uptake of 14 atom % nitrogen by the surface. The C 1s peak shape was seen to alter by an increase in the intensity of the components 2-3 eV away from the main hydrocarbon peak. Groups which may be represented at these shifts may be $C=N$ and $N-C=N$, $-NH-C=O$ type linkages.

Changing the exposure times may provide more information about the nature of this relationship.

f. Summary

When polymers such as polyethylene and polystyrene are subjected to a remote nitrogen plasma their entire surface chemistry is altered. In this work two-step reactions were performed on the surface of these polymers and the reaction products were investigated using photoelectron spectroscopy. The two-step reactions were compared to each other and to the equivalent single step reactions.

It was found that after the remote nitrogen plasma treatment of polyethylene surfaces, the C 1s spectra already indicated a substantial increase in the number of functional groups on the polymer surface extending from C-N species to C—O species. Subsequent reaction with ozone increased this level of functionality even further. Comparing these results with that of single step ozone treatment of polyethylene, showed the dramatic effect caused by the remote nitrogen plasma. Comparison of the C 1s spectra of the two reactions indicated very low amounts of C—O groups on the surface for the single step reaction as compared to the two-step reaction.

In another two-step reaction, the second step investigated was corona discharge. This created entirely different chemical species on the polymer surface, observed by the formation of an extra, high energy peak in the N 1s spectrum, representing $NO_3$ groups.

Thus, while the two-step ozone reaction caused differences in the C 1s spectra, indicating that ozone attacks C sites, the two-step discharge reaction also caused differences in the N 1s spectrum, indicating that excited species also attack the nitrogen sites. No evidence was found for oxygen attack on nitrogen sites in the two-step ozone or the single step remote nitrogen plasma treatment, even though oxygen species are present in each case.

Further experimentation indicated that a similar two-step discharge reaction with polystyrene required a certain extent of nitridation of the polymer surface before the formation of $NO_2$ groups was observed. This suggested that the formation of $NO_2$ groups on polystyrene is dependent on the percentage of nitrogen present on the surface.

The following conclusions can be drawn:
(1) The process achieves a very high percentage of nitrogen uptake by high density polyethylene during the process of downstream nitrogen plasma treatment.
(2) If oxygen is incorporated into the polymer surface during downstream nitrogen plasma treatment, it adds to carbon sites, but not to nitrogen sites.
(3) Downstream nitrogen plasma treatment sensitizes the surfaces of high density polyethylene towards other reactions.
(4) If the downstream nitrogen plasma treatment is followed by ozone treatment, the ozone does not react with nitrogen sites, but only with carbon sites.
(5) The functional groups formed during this two-step reaction process include primary, secondary and tertiary amines, imines, cyano, hydroxyls, carbonyls, carboxyls, etc..
(6) On the other hand, if the second step in the two-step reaction process is corona discharge the excited oxygen attacks nitrogen sites as well as carbon sites.
(7) During the two-step process with corona discharge, $NO_2$ groups are formed on the surface of the polymer as a result of oxygen attack on the nitrogen sites formed during the first step.

Similarly, if nitrogen plasma treatment is preceded by oxygen plasma treatment it is anticipated that a faster rate of uptake will be observed.

It will be appreciated that the above description relates to the preferred embodiment(s) by way of example only. Many variations and modifications will be apparent to those skilled in the field, and such obvious variations are considered to be within the scope of the invention, whether or not expressly described above.

For example, it should be apparent that the invention is not limited to polyethylene and polystyrene, but will be applicable to surface modification of all polymers where this type of modification is desired, including for example, polypropylene, polyisobutylene, and polyvinyl alcohol.

It should also be apparent that other second-stage processes or reaction means could be used, such as argon and other plasmas, as well as the reversal of the above-mentioned steps. The utility of any particular combination of steps can be readily determined through routine experimental work.

It should also be appreciated that the above-described results are based on laboratory experimentation and laboratory-scale equipment. The commercial utility of the invention has therefore not been proven. The commercial apparatus will no doubt vary considerably in size and form from the equipment described above. However, regardless of the form of the eventual commercial embodiment of the invention, the basic principles outlined in this description will be applicable. Any method or apparatus which employs these basic principles, as defined in the following claims, will be considered to infringe on the patent, regardless of differences in actual physical structure which have nothing to do with the substance of the invention.

What is claimed as the invention is:

1. A method of modifying the surface characteristics of a polymer, comprising the steps of:
    exposing said polymer to a plasma in a low pressure stream of nitrogen atoms in a primary reaction chamber;
    transferring said polymer from said primary reaction chamber to a secondary reaction site; and
    exposing said polymer to a secondary treatment at said secondary reaction site, where said secondary treatment is selected from the group consisting of remote plasma treatment, corona discharge treatment or ozone treatment.

2. A method as recited in claim 1, in which said secondary treatment is ozone treatment.

3. A method as recited in claim 2, in which the polymer is polyethylene.

4. A method as recited in claim 2, in which the polymer is polystyrene.

5. A method as recited in claim 1, in which said secondary treatment is corona discharge treatment.

6. A method as recited in claim 5, in which the polymer is polyethylene.

7. A method as recited in claim 5, in which the polymer is polystyrene.

8. A method as recited in claim 1, wherein said plasma has a main region and an after glow region, and said polymer, when in said primary reaction chamber, is positioned downstream from the plasma in terms of the direction of flow of the nitrogen stream, away from said main region of the plasma and in said afterglow region thereof.

9. A method as recited in claim 2, wherein said plasma has a main region and an after glow region, and said polymer, when in said primary reaction chamber, is positioned downstream from the plasma in terms of the direction of flow of the nitrogen stream, away from said main region of the plasma and in said afterglow region thereof.

10. A method as recited in claim 3, wherein said plasma has a main region and an after glow region, and said polymer, when in said primary reaction chamber, is positioned downstream from the plasma in terms of the direction of flow of the nitrogen stream, away from said main region of the plasma and in said afterglow region thereof.

11. A method as recited in claim 4, wherein said plasma has a main region and an after glow region, and said polymer, when in said primary reaction chamber, is positioned downstream from the plasma in terms of the direction of flow of the nitrogen stream, away from said main region of the plasma and in said afterglow region thereof.

12. A method as recited in claim 5, wherein said plasma has a main region and an after glow region, and said polymer, when in said primary reaction chamber, is positioned downstream from the plasma in terms of the direction of flow of the nitrogen stream, away from said main region of the plasma and in said afterglow region thereof.

13. A method as recited in claim 6, wherein said plasma has a main region and an after glow region, and said polymer, when in said primary reaction chamber, is positioned downstream from the plasma in terms of the direction of flow of the nitrogen stream, away from said main region of the plasma and in said afterglow region thereof.

14. A method as recited in claim 7, wherein said plasma has a main region and an after glow region, and said polymer, when in said primary reaction chamber, is positioned downstream from the plasma in terms of the direction of flow of the nitrogen stream, away from said main region of the plasma and in said afterglow region thereof.

* * * * *

UNITED STATES PATENT AND TRADEMARK OFFICE
CERTIFICATE OF CORRECTION

PATENT NO. : 5,147,678

DATED : September 15, 1992

INVENTOR(S) : Renate Foerch, et al

It is certified that error appears in the above-identified patent and that said Letters Patent is hereby corrected as shown below:

At column 2, line 67, "ls s" should be --ls--.

At column 3, line 7, "polyethylene" should be --polystyrene--.

At column 3, line 16, "and" should be --;--.

At column 3, line 25, "nitrogen" should be --oxygen--.

At column 3, line 27, "showing" should be --shows--.

At column 7, line 27, "N." should be --$N_2$--.

Signed and Sealed this

Sixteenth Day of November, 1993

*Attest:*

BRUCE LEHMAN

*Attesting Officer*

*Commissioner of Patents and Trademarks*